United States Patent [19]

Gaither et al.

[11] 4,128,251
[45] Dec. 5, 1978

[54] SEALING GASKET FOR AIR FILTER

[75] Inventors: Howard H. Gaither, Albion; Charles J. Casaleggi, Mt. Carmel, both of Ill.

[73] Assignee: Champion Laboratories, Inc., West Salem, Ill.

[21] Appl. No.: 835,153

[22] Filed: Sep. 21, 1977

[51] Int. Cl.² ............................................. F16J 15/06
[52] U.S. Cl. .............................. 277/233; 277/207 R; 277/228; 55/502
[58] Field of Search ................. 277/205, 207 R, 96, 277/96.1, 96.2, 212 R, 212 F, 227, 228, 152, 153, 231-234, 180, 177; 55/497, 502, 507, 509

[56] References Cited

U.S. PATENT DOCUMENTS

| 2,081,040 | 5/1937 | King | 277/205 X |
|---|---|---|---|
| 2,275,235 | 3/1942 | Shanklin et al. | 277/228 X |
| 2,732,031 | 1/1956 | Rabbitt et al. | 55/502 X |
| 2,951,721 | 9/1960 | Asp | 277/227 X |
| 3,104,966 | 9/1963 | Goulet et al. | 55/502 X |
| 3,366,392 | 1/1968 | Kennel | 277/177 |
| 3,389,921 | 6/1968 | Lojkutz | 277/96.2 X |
| 3,399,516 | 9/1968 | Hough et al. | 55/502 X |

FOREIGN PATENT DOCUMENTS 1195693  6/1970  United Kingdom .................. 277/231

Primary Examiner—Robert S. Ward, Jr.
Attorney, Agent, or Firm—Seymour Rothstein

[57] ABSTRACT

A sealing gasket for an automotive air filter comprising an annular member which includes a base portion and a seal portion. The base portion is of harder durometer than the seal portion whereby the seal portion can more readily adapt to the contour of a contact surface which it may engage so as to provide a better seal between the sealing gasket and the contact surface. In a preferred form of the invention, the seal portion comprises an annular projecting part having a lower durometer than the base portion, said lower durometer being on the order of 25 Shore A.

9 Claims, 4 Drawing Figures

U.S. Patent  Dec. 5, 1978  4,128,251
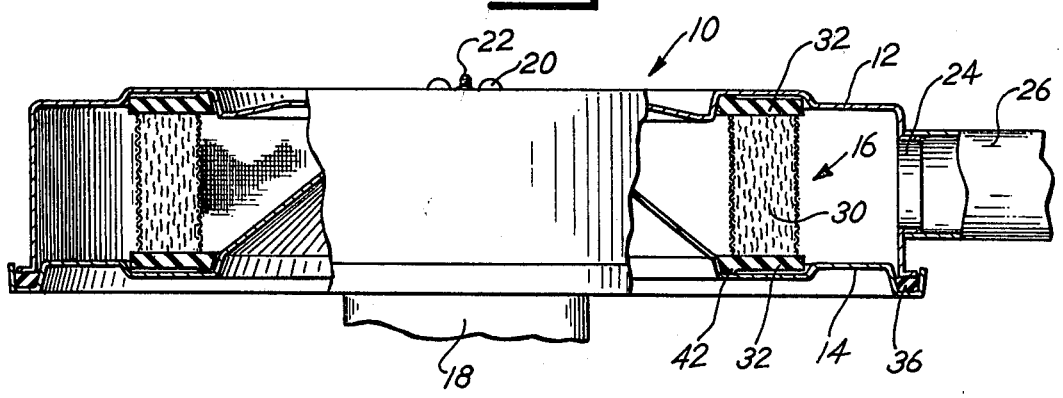
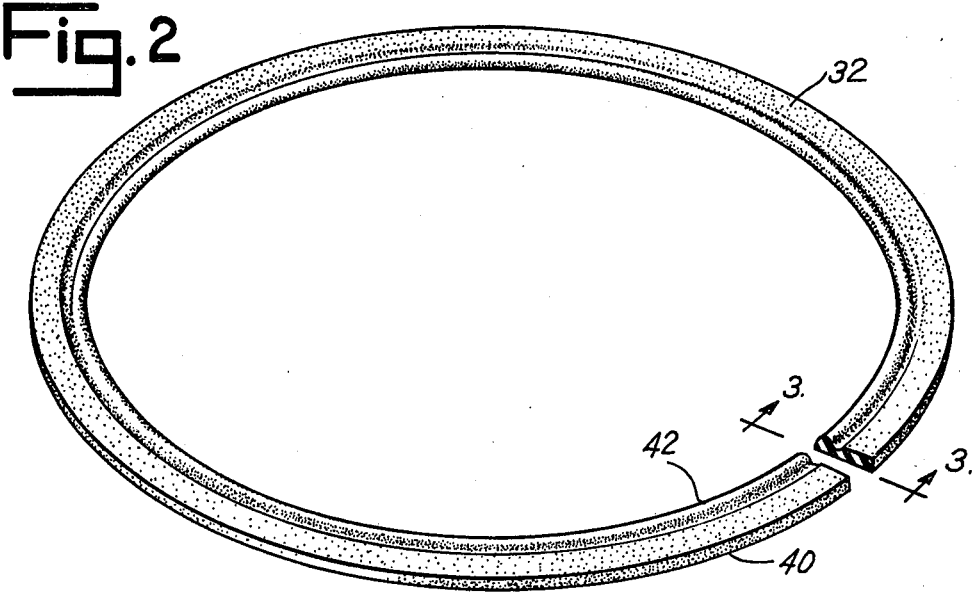
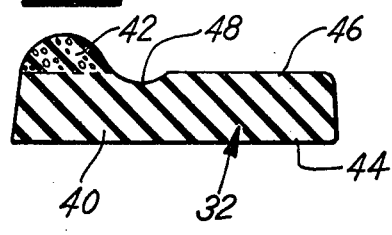
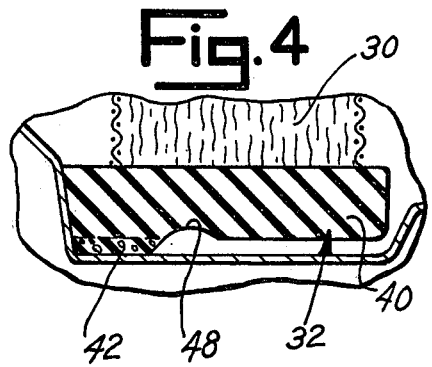

SEALING GASKET FOR AIR FILTER

BACKGROUND OF THE INVENTION

This invention relates to an improved sealing gasket for an air filter, and more particularly, to a sealing gasket for such filter which includes a relatively hard backing portion and a relatively soft sealing portion.

One weakness in a typical carburetor air filter construction is that the gasket does not always effectively seal between the filter and the air filter housing or cover and air may leak between the gasket and the air filter housing or cover and therefore, bypass the filter media. Unfiltered air may reach the carburetor and possibly interfere with operation of the carburetor and/or engine. The leakage may be caused by the housing or cover having a warped or irregular surface The leakage may be reduced by using a soft gasketing material, however, a soft gasketing material will not have sufficient strength or physical integrity to make a strong bond to the filtering media.

Air filters which comprise a filter media with a gasket affixed at either end of the media are known in the prior art. These filters are commonly made by placing the filter media into a mold, filling the mold with a plastic resin and heating the resin until it becomes a solid mass fused with the filter media. The process is repeated to form a sealing gasket on both sides of the filter media. For example, Rabbit et al. U.S. Pat. No. 2,732,031 discloses a cartridge for an air filter which includes a filter media having gaskets made of vinyl chloride or polyvinyl chloride affixed to opposite ends of the filter media. The gasket of Rabbit et al. is made of material having a uniform durometer or hardness therethrough and thus, is subject to the weaknesses discussed above. Holloway U.S. Pat. No. 3,235,633 and Thronburge U.S. Pat. No. 2,941,620 discloses similar air filters as shown in Rabbit et al. and are representative of the known prior art. It is also known to form filters from a similar process using gasketing material that does not require heating.

The Rodgers U.S. Pat. No. 3,397,518 suggests a seal for an air filter which includes a seal member having an irregular outer surface, however, there is no suggestion that the seal have portions of different durometer in order to provide a better seal between the seal and contact surface.

One object of the present invention is to provide an improved sealing gasket for an air filter which overcomes the disadvantages and deficiencies of prior constructions.

Another object of this invention is to provide a sealing gasket for an air filter which comprises an annular member having a base portion and a seal portion, the base portion having a higher durometer than the seal portion, and means to provide space for the seal portion which may be deformed in use, whereby the seal portion can more readily adapt to the contour of the contract surface so as to provide a better seal between the sealing gasket and such contact surface.

Yet another object of this invention is to provide a sealing gasket for an air filter comprising an annular member having a base portion and a sealing portion, the base portion having a higher durometer than the sealing portion, whereby the sealing portion can more readily adapt to the contour of a contact surface which it may engage so as to provide a better seal between the sealing gasket and such contact surface, said base portion including a generally flat first surface and an opposite surface from which the sealing portion projects, and an annular recess in the said opposite surface in order to provide space for the sealing portion which may be deformed in use. Other objects and advantages of the invention will be made more apparent hereinafter.

BRIEF DESCRIPTION OF THE DRAWING

A presently preferred embodiment of the present invention is shown in the drawing, wherein:

FIG. 1 is a cross section of a typical carburetor air filter embodying a sealing gasket of the present invention;

FIG. 2 is a perspective view of a sealing gasket;

FIG. 3 is a cross section of the sealing gasket taken generally along the line 3—3 of FIG. 2; and FIG. 4 is an enlarged detailed view of the carburetor air filter illustrated in FIG. 1.

DETAILED DESCRIPTION OF THE INVENTION

With reference to FIG. 1, there is illustrated an air filter assembly 10 which includes the air filter of the present invention. The air filter assembly 10 includes a housing having an upper member 12 and a lower member 14 and an air filter 16 adapted to be retained in the housing. The air filter assembly 10 is disposed on the top of the conventional carburetor 18 of an automobile. The cover 12 of the housing is secured to the base portion 14 of the air filter assembly by means of the wing nut 20 mounted on the stud 22 in normal fashion. The stud 22 extends from the carburetor 18 and helps retain the air filter assembly 10 in place on the carburetor.

The air filter assembly 10 includes a stub inlet 24 adapted to receive a conduit 26 which receives air to be filtered prior to entry into the carburetor 18. The air filter 16 includes a filter media 30 generally annular in configuration to which are affixed at the upper and lower ends sealing gaskets 32. The sealing gaskets are adapted to both form the ends of the air filter 16 and to seal between the air filter and the housings so as to preclude air leaking between the gasket and the housing and to force all of the air through the filter media 30. The filter media may be of conventional construction comprising pleated paper of other materials. The shape of the filter need not necessarily be round, as shown. The details of the filter media form no part of the present invention.

As shown in FIG. 1, an annular sealing member 36 of elastomeric or rubber-like material is provided between the cover 12 and the bottom portion 14 of th air filter assembly housing. Such sealing member may be omitted if desired.

With reference to FIGS. 2, 3, and 4, it will be seen that the sealing gasket 32 comprises an annular member having a base portion 40 and a sealing portion 42. A feature of this invention is that the base portion 40 is of a higher durometer than the sealing portion 42 so that the sealing portion can more readily adapt to the contour of the contact surface which it engages so as to provide a better seal between the sealing gasket and such contact surface, namely, the surface of the housing and the surface of the housing cover which is engaged.

Preferably, the sealing gasket is made from a vinyl dispersion (plastisol) or polyvinyl chloride material having a Shore A durometer on the order of 25 to 30 in the region of bead portion 42 and a durometer on the order of 45 to 55 Shore A in the region of the base portion 40. The sealing gaskets generally are made from PVC resin, plasticizers, stabilizers and fillers. There is some criticality in the Shore A durometer of the seal or bead portion. It has been determined that if the durometer were lower than Shore A 25 there could be a tendancy for the soft polymer to adhere to the housing. This might be desirable in providing a better seal in a one-time use air filter. In the present invention which is intended mainly to be used for a replaceable air filter, it is desired that the Shore A durometer of the bead portion be on the order of 25 to 30 and in no event lower than 25 so as to prevent adherance of the bead portion to the inner surface of the air filter housing.

The annular member or sealing gasket 32 includes a flat surface 44 into which the filter media may be embedded and an opposite surface 46 from which the sealing portion or bead portion 42 may project. Adjacent the bead portion 42 in the upper surface 46 is a recess 48. The recess 48 is adapted to provide space for the bead portion which may be displaced or deformed in use. For example, it is possible that the sealing gasket 32 may be formed with an outer surface contoured to engage a complementary surface of the air filter housing. However, in order to provide for use in a number of different housing configurations and enhance interchangeability, the exterior of the bead portion 42 is generally hemispherical in cross section as shown for example in FIG. 3 and is of a lower durometer than the base portion 40. If the bead portion 42 engaged a flat surface of the housing, te bead portion 42 would be at least partially compressed to form a seal that would prevent undesirable air passage between the gaskets and the cover 21 and bottom 14, respectively, of the housing.

The sealing gasket 32 could be in shapes other than the preferred shape illustrated. For example, the sealing gasket 32 could be comprised of two layers, each rectangular in cross section, bonded or otherwise joined. One layer could be formed of a relatively low durometer resilient material and the other layer could be formed of a relatively high durometer material.

Sealing gaskets have been constructed from a vinyl dispersion in the form of a flat gasket wherein the durometer of the outer surface has been lowered. The lower durometer can be obtained by softening the gasket material, either as a soft continuous polymer or by the use of a foamed polymer.

One example of an air filter sealing gasket embodying the present invention was made by using a high viscosity vinyl dispersion (plastisol) that had a durometer of Shore A 25 at the bead sealing edge portion 42. The viscosity was 150,000 cps at 2.5 rpm and 70,000 cps at 20 rpm at 80° F.

The high viscosity vinyl dispersion was dispensed into the cavity of the mold that had a configuration conforming to the desired surface configuration 46 of the annular member 32. After dispensing the high viscosity vinyl dispersion into the mold, the mold was filled with a vinyl dispersion material having a durometer of Shore A 45 to 55 and the molded product was then processed in a conventional manner. The resultant sealing gasket had a relatively manner. The resultant sealing gasket had a relatively soft sealing bead 42 and a relatively hard and tough base portion 40.

Another filter sealing gasket embodying the principles of the present invention was made using a vinyl dispersion (plastisol) to which had been added a chemical foaming agent that resulted in a vinyl dispersion with a durometer of Shore A 25. The expansion rate of the material was approximately 20%. The material was compounded to have a viscosity of 100,000 cps at 2.5 rpm and 65,000 cps at 20 rpm at 80° F. The vinyl dispersion was dispersed into the bead area in the mold. The mold was then filled in the normal manner with a higher durometer vinyl dispersion to form the sealing gasket. The relatively high viscosity of the vinyl dispersion prevented an intimate mixing of the foamed material and the regular material. Curing made the foam expand and resulted in a scaling gasket having an annular bead that had a durometer of Shore A 25.

Yet another sealing gasket was made using a gel method of processing a low viscosity vinyl dispersion (plastisol) with a durometer of Shore A 25. The viscosity was 8,000 cps at 2.5 rpm and 4,000 cps at 20 rpm at 80° F. The low viscosity, low durometer Shore A 25 material was dispensed into the cavity of the mold that had a surface corresponding to the surface 46 of FIG. 3. After dispensing the low viscosity plastisol material into the mold, the material was heated to approximately 195° F to gel it. Then the mold was filled with higher durometer material using the ordinary technique. The gelatin of the low durometer material prevented the intimate mixing of the low durometer material with the regular durometer material. The gasket was cured in the normal way. The resultant gasket had a soft sealing bead 42 with the tough backing provided by the base portion 40.

A method of fabricating a sealing gasket using a hot melt polyvinyl chloride material having a durometer of 25 Shore A and having a sealing bead is as follows. The low durometer hot melt polyvinyl chloride material is dispensed into a cavity of the mold having a surface corresponding to the exterior surface 46 of the annular member 32. The mold is heated to a temperature of 130° ± 10° F.

After dispensing the hot melt polyvinyl chloride having a durometer of Shore A 25 into the bead cavity, the mold is moved to another station and the mold is filled to its normal volume using a hot melt polyvinyl chloride having a Shore A durometer of 45 to 55.

The mold is then cooled to approximately 100° F. and the sealing gasket is removed from the mold.

Sealing gaskets have also been fabricated from a hot melt, polyvinyl chloride material, having a lower durometer sealing bead and by lowering the durometer of the outer 25% of the surface of a flat gasket. Although the present invention may be adapted for a flat gasket or gasket formed with a rectangular cross-section, it is preferred that the sealing gasket have the cross sectional configuration shown in FIG. 3. The construction provides for interchangeable applications in a variety of air filter assemblies and for better sealing between the air filter and the housing.

There has been provided by the present invention a sealing gasket for an air filter which is readily fabricated and which overcomes the air leakage problems attendant to conventional air filter gaskets.

A variety of variations and modifications will become apparent to those skilled in the art upon reading of this specification and are intended to be encompassed within the scope of the claims appended thereto.

What is claimed is:

1. A sealing gasket for an air filter comprising an annular member having a base portion and a sealing portion, the base portion having a higher durometer than the sealing portion, whereby the sealing portion can more readily adapt to the contour of a contact surface which it may engage so as to provide a better seal between the sealing gasket and such contact surface, said base portion including a generally flat first surface and an opposite surface from which the sealing portion projects, and an annular recess in the said opposite surface in order to provide space for the sealing portion which may be deformed in use.

2. A sealing gasket as in claim 1 wherein the sealing portion is annular.

3. A sealing gasket as in claim 1 wherein the sealing portion is generally hemispherical in cross section.

4. A sealing gasket as in claim 1 wherein the base portion is fabricated from a material having a Shore A durometer on the order of 45 to 55 and the sealing portion is fabricated from a material having a Shore A durometer on the order of 25 to 35.

5. A sealing gasket as in claim 1 wherein the annular member is made from a hot melt polyvinyl chloride material.

6. A sealing gasket as in claim 5 wherein the sealing portion has a Shore A durometer on the order of 25 to 30.

7. A sealing gasket as in claim 1 wherein the Shore A durometer of the sealing portion is of sufficient magnitude to enable the sealing portion to sealingly engage with said contact surface without adhering thereto.

8. A sealing gasket as in claim 7 wherein the sealing portion has a Shore A durometer of 25.

9. A sealing gasket for an air filter comprising an annular member having a base portion and a sealing portion, the base portion having a higher durometer than the sealing portion, whereby the sealing portion can more readily adapt to the contour of a contact surface which it may engage so as to provide a better seal between the sealing gasket and such contact surface, said base portion including a generally flat first surface and an opposite surface from which the sealing portion projects, and means to provide space for the sealing portion which may be deformed in use.

* * * * *